United States Patent [19]

Hofmann et al.

[11] Patent Number: 4,681,306
[45] Date of Patent: Jul. 21, 1987

[54] TWO CHAMBER ENGINE MOUNT WITH HYDRAULIC DAMPING

[75] Inventors: Manfred Hofmann, Hünfelden; Hans Müller, Höhr-Grenzhausen; Ralf Waldecker, Neuwied, all of Fed. Rep. of Germany

[73] Assignee: Metzeler Kautschuk GmbH, Munich, Fed. Rep. of Germany

[21] Appl. No.: 715,530

[22] Filed: Mar. 25, 1985

[30] Foreign Application Priority Data

Mar. 23, 1984 [DE] Fed. Rep. of Germany ....... 3410781

[51] Int. Cl.⁴ .......................... F16F 9/10; B60K 5/12
[52] U.S. Cl. ............... 267/140.1; 267/8 R; 188/319
[58] Field of Search ............... 188/299, 319; 267/140.1, 1, 35, 64.13, 152, 141, 136, 63 R, 63 A, 64.15, 64.23, 64.27; 248/636, 659, 562, 563, 566; 280/710, 712

[56] References Cited

U.S. PATENT DOCUMENTS

| | | | |
|---|---|---|---|
| 1,273,011 | 7/1918 | Snyder | 188/319 |
| 1,618,326 | 2/1927 | Cosentino | 188/319 |
| 1,810,233 | 6/1931 | Walden | 188/319 |
| 2,335,907 | 12/1943 | Boor et al. | 188/319 |
| 2,380,899 | 7/1945 | Strachovsky | 267/140.1 |
| 2,457,749 | 12/1948 | Thiry | 267/140.1 |
| 4,422,779 | 12/1983 | Hamackers et al. | 267/140.1 |

FOREIGN PATENT DOCUMENTS

| | | | |
|---|---|---|---|
| 0027751 | 4/1981 | European Pat. Off. | 267/140.1 |
| 0115417 | 8/1984 | European Pat. Off. | 267/140.1 |
| 2057275 | 5/1972 | Fed. Rep. of Germany | 188/319 |
| 0161331 | 10/1982 | Japan | 267/140.1 |

Primary Examiner—John W. Caldwell, Sr.
Assistant Examiner—Alvin Oberley
Attorney, Agent, or Firm—Herbert L. Lerner; Laurence A. Greenberg

[57] ABSTRACT

A two chamber engine mount with hydraulic damping includes rubber-elastic peripheral walls, a support housing disposed outside at least one of the walls, an orifice plate disposed between the walls defining upper and lower fluid-filled chambers above and below the orifice plate being substantially horizontally divided into an upper plate half being stationary and a lower plate half being rotatable and having a central axis, the orifice plate having an orifice canal formed at least partly in the lower plate half interconnecting the chambers and having a given open length and cross section, a centrally disposed pin integral with the lower plate half and extending through the support housing for rotating the lower plate half about the central axis relative to the upper plate half, varying at least one of the length and cross section of the canal.

4 Claims, 9 Drawing Figures

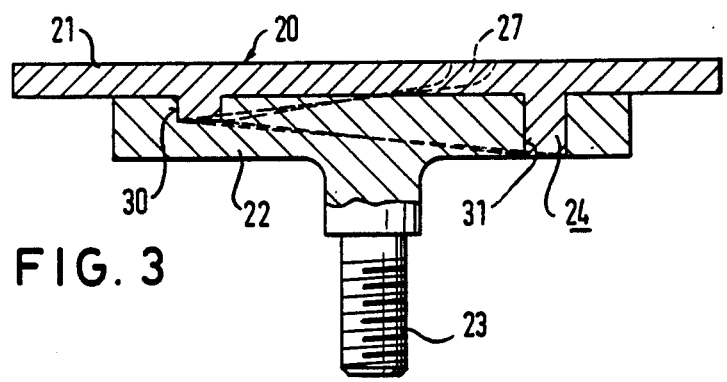
FIG. 3
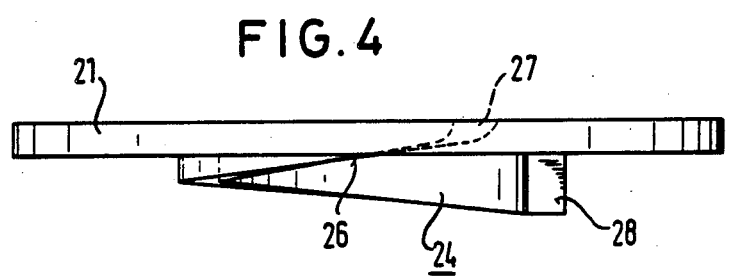
FIG. 4
FIG. 5
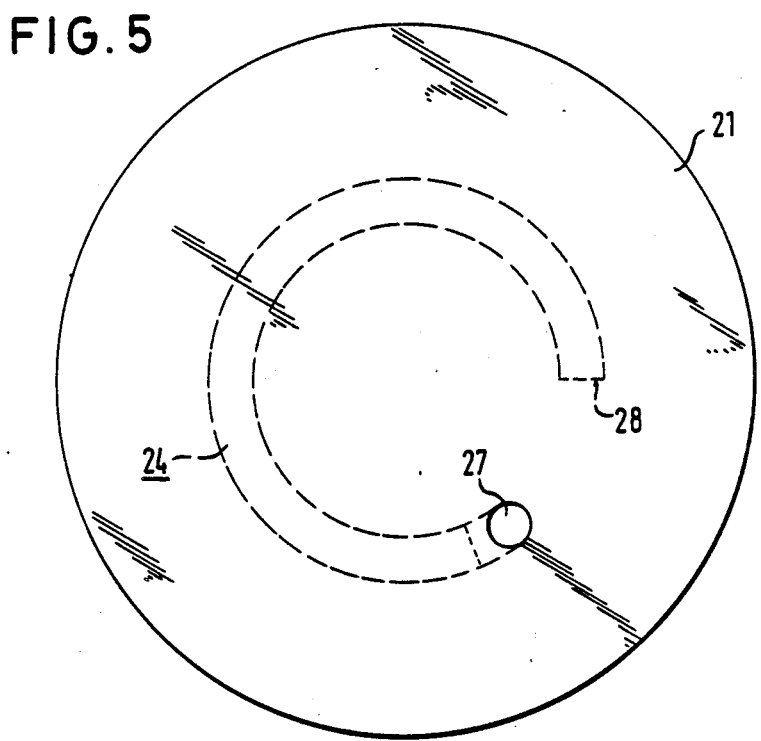

TWO CHAMBER ENGINE MOUNT WITH HYDRAULIC DAMPING

The invention relates to a two chamber engine mount with hydraulic damping, having rubber-elastic peripheral walls surrounding both fluid-filled chambers, and an orifice plate having an orifice canal therein, disposed between and interconnecting the chambers.

The damping values of engine mounts of this type which are normally very good, are generally achieved by the orifice canal in the orifice plate. The canal is very long in proportion to its diameter, so that the fluid column enclosed in the orifice canal acts as the actual damping mass.

In order to obtain optimal damping properties for such engine mounts, the engine mounts must be adjusted for the particular vehicle type, and the special type of engine which is used. However, with such adjustments, only an acceptable average value of damping can be obtained from a great number of different engine mount types which cannot be modified, while an optimal adjustment of the respective engine mount for compensating individual tolerances and other differences, is not possible. This is because the properties of the finally installed engine mount cannot be changed.

It is accordingly an object of the invention to provide a two chamber engine mount with hydraulic damping, which overcomes the hereinafore-mentioned disadvantages of the heretofore-known devices of this general type, and in which, even in the installed condition in the vehicle, an adjustment and therefore an optimal setting of the individual damping properties is still possible.

With the foregoing and other objects in view there is provided, in accordance with the invention, a two chamber engine mount with hydraulic damping, comprising rubber-elastic peripheral walls, a support housing disposed outside at least one of the walls, an orifice plate disposed between the walls defining upper and lower fluid-filled chambers above and below the orifice plate, the orifice plate being substantially horizontally divided into an upper plate half being stationary and a lower plate half being rotatable and having a central axis, the orifice plate having an orifice canal formed at least partly in the lower plate half interconnecting the chambers and having a given open length and cross section, a centrally disposed pin or round portion integral with the lower plate half and extending through the support housing for rotating the lower plate half about the central axis relative to the upper plate half, varying at least one of the length and/or cross section of the canal.

The horizontal division of the orifice plate into an upper plate half, which is stationary in the engine mount, and a lower platehalf, which can be rotated relative to the upper plate half, enables the length and/or cross section of the orifice canal to be varied in a simple way.

In accordance with another feature of the invention, the housing walls include a lower wall, the support housing is a solid protective housing, and including a bushing passing through the support housing, the pin leading outwardly fluid-tightly through the lower housing wall and the bushing.

In accordance with a further feature of the invention, the orifice canal is circular-arcuate and extends over at least 180°, the lower plate half has an outlet opening formed exclusively therein at an end of the orifice canal, the upper plate half has an inlet opening formed therein at a predetermined location along the orifice canal, and the lower plate half has a guide pin formed thereon engaged in an arcuate groove formed in the upper plate half and shaped as a mirror image of the orifice canal.

In accordance with an added feature of the invention, the groove is a recess passing through the upper plate half.

In accordance with an additional feature of the invention, the lower plate half has a lower surface having an outlet opening formed therein and an upper surface having the orifice canal gradually arcuately spirally rising therein starting from vicinity of the outlet opening and ending level or running flat with the upper surface, the upper plate half has an upper surface and a lower surface having a circular-arcuate, inclined ramp-shaped projection formed thereon matching or corresponding to the orifice canal and having a flat end blending into an inlet opening passing through the upper plate half.

In accordance with again another feature of the invention, the inlet opening ends tangentially at the upper surface of the upper plate half, matching the incline of the projection.

In accordarce with again a further feature of the invention, the upper plate half has a lower surface having a circular-arcuate groove formed therein and an upper surface having an inlet opening passing therethrough, the lower plate half has an upper surface having a circular-arcuate projection extending into the groove, the projection having a periphery with an interruption formed at a given location along the periphery extending to the upper surface of the lower plate half.

In accordance with a concomitant feature of the invention, the lower plate half is also axially displaceable.

Other features which are considered as characteristic for the invention are set forth in the appended claims.

Although the invention is illustrated and described herein as embodied in a two chamber engine mount with hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is a partially longitudinal-sectional view of an orifice plate with a spiral-shaped channel for adjustment of the length and cross section of the channel;

FIG. 4 is a side-elevational view of the upper half of the plate according to FIG. 3;

FIG. 5 is a top-plan view of the orifice plate according to FIG. 3;

Figure 1:
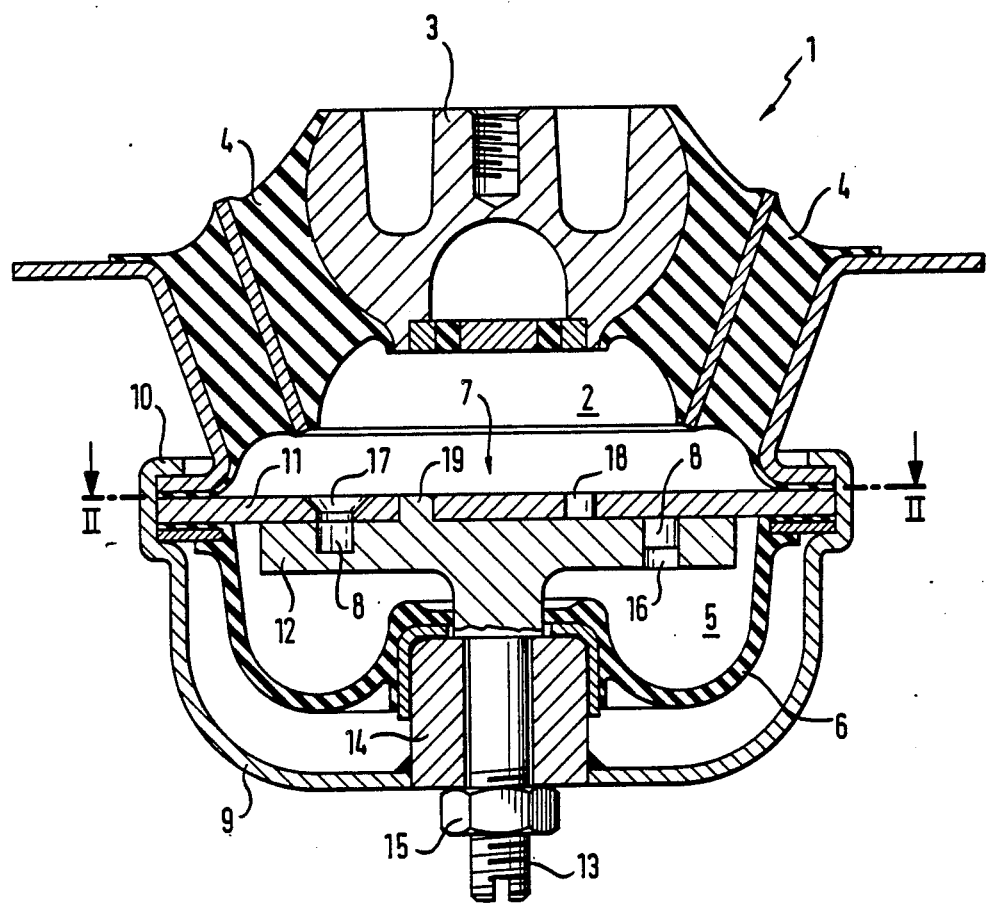
FIG. 1 is a longitudinal-sectional view of a two chamber engine mount with a divided orifice plate.

Referring now to the figures of the drawings in detail and first particularly to FIG. 1 thereof, there is seen a two chamber motor support or engine mount 1 essentially formed of an upper chamber 2 which is enclosed by an elastic or flexible, conical rubber bearing spring 4, which surrounds an engine mount or support plate 3, as well as a lower chamber 5 inside a soft-elastic rubber bellows 6. The two chambers 2 and 5 are connected with each other by a nozzle or orifice canal 8 which is disposed in an orifice plate 7. The lower chamber bellows 6 are enclosed by a metallic cap 9, having an upper rolled edge 10 which clamps and seals the lower end of the chamber wall 4, the orifice plate 7 and the lower chamber bellows 6.

According to the invention, the orifice plate 7 is horizontally divided into an upper plate half 11 which is fixedly built into the engine mount 1, and a lower plate half 12. The lower plate half 12 has a central bolt or pin 13 which extends through the lower chamber bellows 6 and through the solid lower cap or support housing wall 9. The pin 13 is conducted to the outside through a bushing 14 which is disposed in the solid lower cap or support housing wall 9, and the pin is clamped by a nut 15.

Figure 2:
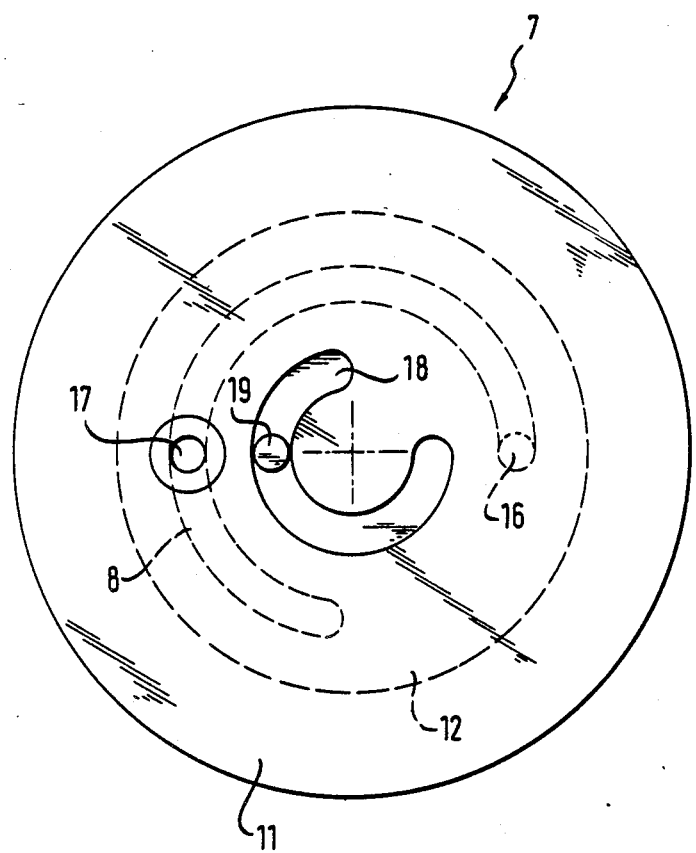
FIG. 2 is a top-plan view of the orifice plate, taken along the line II—II in FIG. 1, in the direction of the arrows.

The orifice canal 8 is only machined into the lower plate part 12, and extends in an arc over at least 180°, as shown in broken lines in the plan view according to FIG. 2. The orifice canal 8 has an outlet opening 16 at the end thereof, which passes through the lower plate half 12, while an inlet opening 17 is disposed in the upper plate half 11, and is aligned with the arcuate orifice canal 8. As a result of this structure, the length of the orifice canal 8 can be adjusted by rotating the lower plate half 12 by means of the bolt or pin 13, because the effective length of the orifice canal 8 is measured from the outlet 16 at one end to the respective position of the inlet opening 17 at the other end.

In order to guide the lower plate half 12, an arcuate groove 18 with the same peripheral or segmental angle as the orifice canal 8, but disposed in a mirror-image like position, is cut into the upper plate half 11. A guide pin 19 which is formed on the lower plate half 12, is guided in the groove 18 and also acts as a stop. In this way, the angle of rotation of the lower plate half 12 can be limited corresponding to the length of the nozzle canal 8.

The division of the orifice plate into an upper and a lower plate half which can be rotated with respect to each other, and the corresponding configuration of the orifice canal, permits the simple adjustment of the length of the orifice canal and thereby optimizes the required damping, even after the engine mount has been finally installed.

Another possible construction of the orifice plate enabling the cross section of the orifice canal to be changed, is shown in FIGS. 3-7. As can be learned from the longitudinal section according to FIG. 3, the orifice plate 20 is also formed of an upper plate half 21 and a lower plate half 22 with a centrally-disposed bolt 23. As is shown in the side view according to FIG. 4, the upper plate half 21 is provided at its lower surface with a circular, arcuate ramp-like projection 24. The length of the projection 24 is indicated by showing the projection in broken lines in the plan view of the upper plate half 21, according to FIG. 5. The flat or planar end 26 of the projection leads tangentially into an inlet opening 27 which extends through the upper plate half 21. The other end of the projection 24 leads to a vertical shoulder 28.

Figure 6:
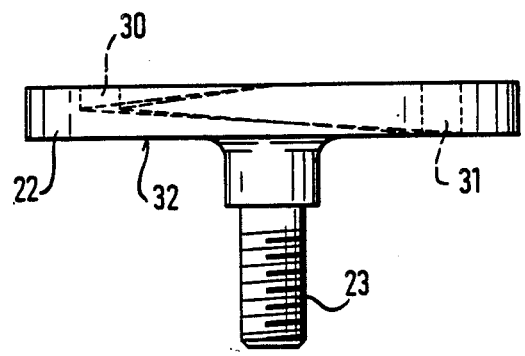
FIG. 6 is a side-elevational view of the lower half of the plate of the embodiment according to FIG. 3.
Figure 7:
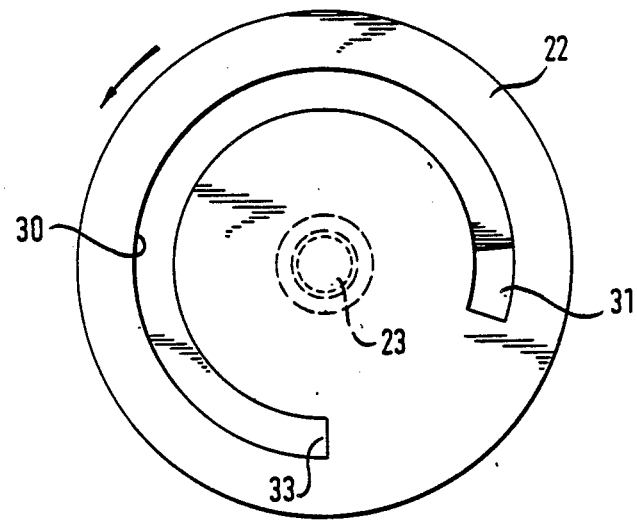
FIG. 7 is a top-plan view of the lower half of the plate according to FIG. 5.

Corresponding to the projection 24, a similarly circular, arcuate, spirally-rising orifice canal 30 is cut into the lower plate half 22, as shown in FIGS. 6 and 7. The canal 30 begins in the region of an outlet opening 31 at the lower surface 32 of the lower plate half 22, and leads tangentially to another end 33 at the upper surface.

As can easily be seen from the longitudinal section of FIG. 3, as the lower plate half 22 is rotated about the bolt 23, the cross section of the orifice canal 30 increases or decreases, depending on the direction of rotation, while the length of the orifice canal 30 also changes slightly.

The amount of fluid contained in the orifice canal also changes with the cross-sectional change, so that it becomes possible to adjust the damping values correspondingly.

Figure 8:
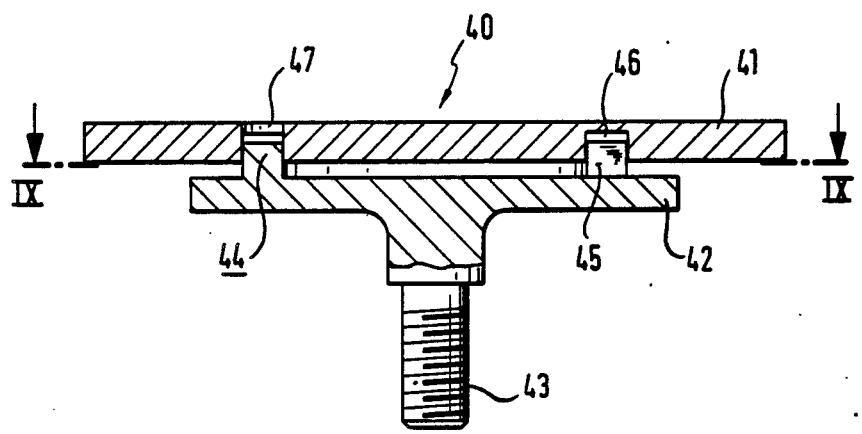
FIG. 8 is a longitudinal-sectional view of another variation of an orifice plate which is divided in two parts with an adjustment for the length and/or cross section of the orifice channel.
Figure 9:
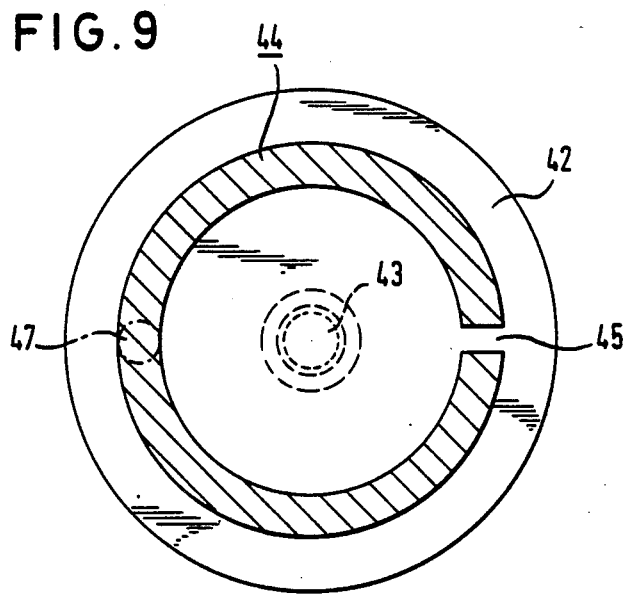
FIG. 9 is a top-plan view of the lower plate half of the orifice plate taken along the line IX—IX in FIG. 8, in the direction of the arrows.

An additional configuration for changing the length and/or cross section of the orifice canal is shown in the embodiments illustrated in FIGS. 8 and 9. The longitudinal section according to FIG. 8 shows that an orifice plate 40 is also divided into an upper plate half 41 and a lower plate half 42 having a central bolt 43. The lower plate half 42 has an annular projection 44 with a rectangular cross section which is interrupted at the location of an outlet opening 45, as shown in the plan view according to FIG. 9. An orifice channel 46 which runs all around symmetrical to the projection 44, is cut into the upper plate half 41. An inlet opening 47 perforates the upper plate at one location. The projection 44 on the lower plate half 42 may be inserted into the orifice canal 46 in the upper plate half 41. An orifice canal 46 of varied length is then formed between inlet opening 47 and the outlet opening 45, if the lower plate half 42 is rotated. Furthermore, the cross section of the orifice canal can be changed by vertical displacement of the lower plate half 42.

This construction also permits an adjustment of the orifice canal when the engine mount is installed, for optimizing the damping properties.

According to the principles set forth in the illustrated embodiments, two chamber engine mounts can be constructed which can be given optimum damping properties in a simple way in the finished, assembled state, and even after their installation into a vehicle. This is due to the feature which permits the orifice canal that is essential for the damping characteristics, to be adjusted with regard to its length, its cross section, or both.

We claim:

1. Two chamber engine mount with hydraulic damping, comprising rubber-elastic peripheral walls including a lower wall, a solid protective support housing disposed outside at least one of said walls, an orifice plate disposed between said walls defining upper and lower fluid-filled chambers above and below said orifice plate, said orifice plate being substantially horizontally divided into an upper plate half being stationary and a lower plate half being rotatable and having a central axis, said orifice plate having an orifice canal formed at least partly in said lower plate half interconnecting said chambers and having a given open length and cross section, a bushing passing through said support housing, and a centrally disposed pin integral with said lower plate half and extending outwardly fluid-tightly through said lower wall and said bushing for rotating said lower plate half about said central axis relative to said upper plate half, varying at least one of said length and cross section of said canal, said lower plate half having a lower surface having an outlet opening formed therein and an upper surface having said orifice canal gradually arcuately spirally rising therein starting from vicinity of said outlet opening and ending level with said upper surface, said upper plate half having an upper surface and a lower surface having an arcuate, inclined ramp-shaped projection formed thereon matching said orifice canal and having a flat end blending into an inlet opening passing through said upper plate half.

2. Two chamber engine mount according to claim 1, wherein said inlet-opening ends tangentially at said upper surface of said upper plate half, matching the incline of said projection.

3. Two chamber engine mount with hydraulic damping, comprising rubber-elastic peripheral walls including a lower wall, a solid protective support housing disposed outside at least one of said walls, an orifice plate disposed between said walls defining upper and lower fluid-filled chambers above and below said orifice plate, said orifice plate being substantially horizontally divided into an upper plate half being stationary and a lower plate half being rotatable and having a central axis, said orifice plate having an orifice canal formed at least partly in said lower plate half interconnecting said chambers and having a given open length and cross section, a bushing passing through said support housing, and a centrally disposed pin integral with said lower plate half and extending outwardly fluid-tight through said lower wall and said bushing for rotating said lower plate half about said central axis relative to said upper plate half, varying at least one of said length and cross section of said canal, said upper plate half having a lower surface having an arcuate groove formed therein and a upper surface having a inlet opening passing therethrough, said lower plate half having an upper surface having an arcuate projection extending into said groove, said projection having a periphery with an interruption formed at a given location along said periphery extending to said upper surface of said lower plate half.

4. Two chamber engine mount according to claim 3, wherein said lower plate half is also axially displaceable.

* * * * *